United States Patent
Bruno, Jr. et al.

(10) Patent No.: US 9,433,862 B2
(45) Date of Patent: Sep. 6, 2016

(54) DYNAMIC ALLOCATION OF COMPUTING RESOURCES IN REMOTE GAMING ENVIRONMENT

(71) Applicant: MICROSOFT CORPORATION, Redmond, WA (US)

(72) Inventors: John Peter Bruno, Jr., Snoqualmie, WA (US); Donald James McNamara, Woodinville, WA (US); Scott Q. Longstreet, Maple Valley, WA (US); Ashok Chandrasekaran, Redmond, WA (US); Christopher Lane Boedigheimer, Redmond, WA (US); Per-Ola Anders Orvendal, Carnation, WA (US); Joseph Cusimano, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/765,024

(22) Filed: Feb. 12, 2013

(65) Prior Publication Data

US 2014/0228108 A1 Aug. 14, 2014

(51) Int. Cl.
*A63F 13/12* (2006.01)
*A63F 13/35* (2014.01)
(Continued)

(52) U.S. Cl.
CPC ............... *A63F 13/35* (2014.09); *A63F 13/30* (2014.09); *A63F 13/352* (2014.09); *G06F 9/505* (2013.01); *G06F 9/5077* (2013.01); *G06F 12/00* (2013.01); *G07F 17/3234* (2013.01);
(Continued)

(58) Field of Classification Search
CPC ...... A63F 13/12; G06F 9/50; G07F 17/3234; G07F 17/3272

USPC ...................................... 463/40–42
See application file for complete search history.

(56) References Cited

U.S. PATENT DOCUMENTS 5,991,808 A * 11/1999 Broder et al. ............... 709/226
7,695,370 B2 * 4/2010 Liu et al. ...................... 463/42
(Continued)

FOREIGN PATENT DOCUMENTS

CN 102710584 A 10/2012

OTHER PUBLICATIONS

International Search Report with Written Opinion mailed May 21, 2014 in PCT Application No. PCT/US2014/015179, 7 pages.
(Continued)

*Primary Examiner* — Dmitry Suhol
*Assistant Examiner* — David Duffy
(74) *Attorney, Agent, or Firm* — Aaron Chatterjee; Judy Yee; Micky Minhas

(57) ABSTRACT

Embodiments of the present invention monitor and dynamically allocate computing resources to game sessions running within a game service. A game service provides a remote gaming environments to which users connect over a wide area network, such as the internet. A game session runs a single instance of a game title. The game session runs the video game code responsible for creating the playing experience for the users. Various characteristics of the game session may be monitored and used to allocate computing resources. Usage of computing resources, such as central processing unit ("CPU") may be monitored directly. In another embodiment, the number of players connected to the game session is monitored and computing resources are allocated dynamically as the number of players increases or decreases.

19 Claims, 9 Drawing Sheets

(51) Int. Cl.
*G06F 12/00* (2006.01)
*A63F 13/30* (2014.01)
*A63F 13/352* (2014.01)
*G07F 17/32* (2006.01)
*H04L 29/06* (2006.01)
*G06F 9/50* (2006.01)

(52) U.S. Cl.
CPC .......... *G07F 17/3272* (2013.01); *H04L 67/38* (2013.01); *G06F 2209/508* (2013.01); *G06F 2209/5016* (2013.01)

(56) References Cited

U.S. PATENT DOCUMENTS

| | | | |
|---|---|---|---|
| 8,024,467 B2 | 9/2011 | Humphrey et al. | |
| 9,122,984 B2* | 9/2015 | Lee | A63F 13/352 |
| 2005/0240935 A1* | 10/2005 | Ramanathan | 718/105 |
| 2007/0022426 A1* | 1/2007 | Steinder et al. | 718/104 |
| 2009/0193146 A1* | 7/2009 | Albert et al. | 709/241 |
| 2009/0199198 A1* | 8/2009 | Horii et al. | 718/104 |
| 2010/0093438 A1* | 4/2010 | Baszucki et al. | 463/42 |
| 2010/0332658 A1* | 12/2010 | Elyashev | 709/226 |
| 2011/0161695 A1* | 6/2011 | Okita et al. | 713/310 |
| 2011/0162005 A1 | 6/2011 | Yerli | |
| 2012/0028712 A1 | 2/2012 | Zuili | |
| 2012/0096368 A1 | 4/2012 | McDowell | |
| 2012/0102185 A1 | 4/2012 | Fernandes | |
| 2012/0137287 A1 | 5/2012 | Pang et al. | |

OTHER PUBLICATIONS

"Store your Saved Games in the Cloud", Retrieved on: Oct. 19, 2012, Available at: http://support.xbox.com/en-US/xbox-live/game-saves-in-the-cloud/cloud-save-games, 3 pages.

Yang, et al., "An Extreme Automation Framework for Scaling Cloud Applications", In IBM Journal of Research and Development, vol. 55, Issue 6, Nov. 2011, 3 pages.

Danihelka, et al., "Interactive 3D Services over Windows Azure", Retrieved on: Oct. 19, 2012, Available at: http://www.rdc.cz/download/publications/danihelka12cloudfutures.pdf.

Marzolla, et al., "Dynamic Resource Provisioning for Cloud Based Gaming Infrastructures", Retrieved on: Oct. 19, 2012, Available at: http://gdangelo.web.cs.unibo.it/pool/papers/gdangelo-CIE-2011-NONUFFICIALE.pdf.

* cited by examiner

DYNAMIC ALLOCATION OF COMPUTING RESOURCES IN REMOTE GAMING ENVIRONMENT

BACKGROUND

Video games have become increasingly popular. Some video games allow multiple players to interact within the same game using client devices that are remotely located from each other. For example, in a peer-to-peer gaming environment, multiple clients throughout the world could connect over a network to a game hosted by one of the client devices. In another example, a server may host a game that multiple client devices join over a wide area network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention monitor and dynamically allocate computing resources to game sessions running within a game service. A game service provides a remote gaming environment to which users connect over a wide area network, such as the internet. For example, the game service could utilize a series of servers, or a series of server farms located throughout the world to host video games. Players then connect to the gaming service using a variety of different client devices including game consoles, smart phones, tablets, personal computers, and other computing devices.

Embodiments of the present invention run game titles that are written for the game session. Titles written for the game session do not use code that manages server resources or other computing resources. Instead, the computing resources allocated to the game session are dynamically updated by the game service as needed by monitoring changes in game session characteristics.

Embodiments of the present invention monitor characteristics of a game session to determine whether computing resources should be added or subtracted from the game session. A game session runs a single instance of a game title. The game session runs the video game code responsible for creating the playing experience for the users.

Various characteristics of the game session may be monitored and used to allocate computing resources. Usage of computing resources, such as central processing unit ("CPU") may be monitored directly. In another embodiment, the number of players connected to the game is monitored and computing resources are reallocated dynamically as the number of players increases or decreases.

BRIEF DESCRIPTION OF THE DRAWINGS

Embodiments of the invention are described in detail below with reference to the attached drawing figures, wherein.

DETAILED DESCRIPTION

Figure 1:
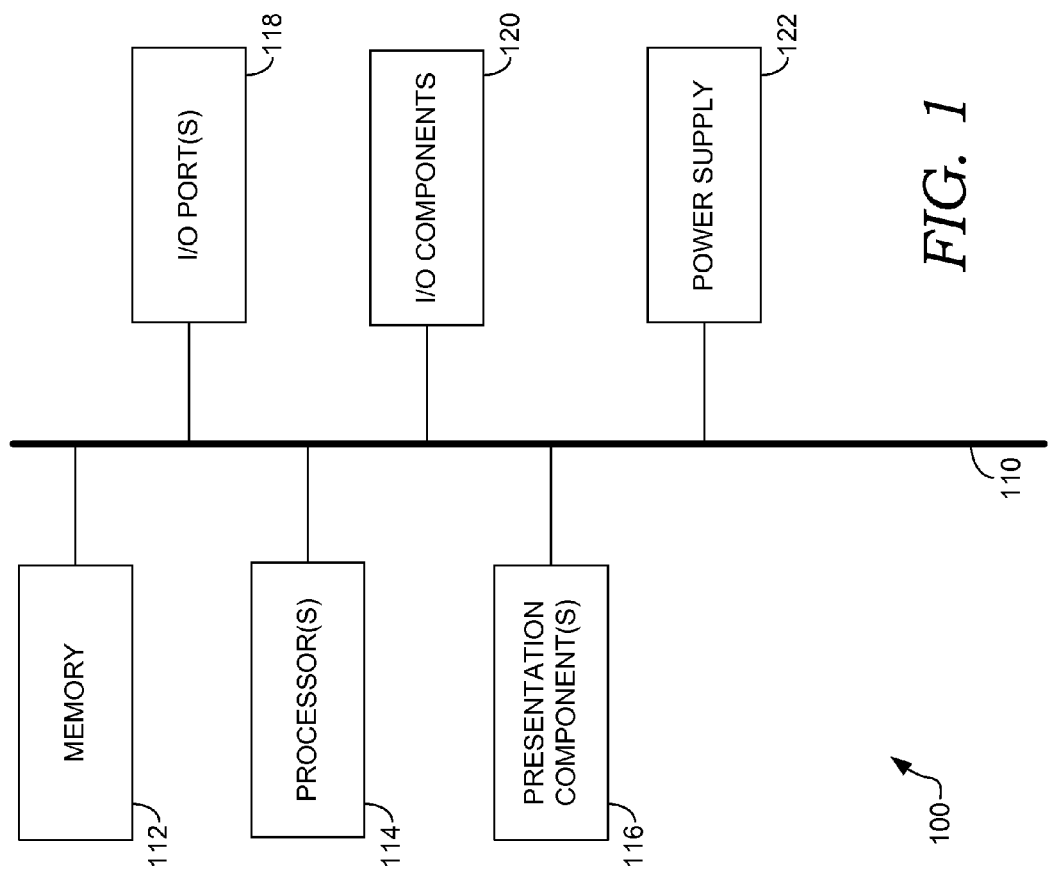
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention monitor and dynamically allocate computing resources to game sessions running within a game service. A game service provides a remote gaming environment to which users connect over a wide area network, such as the internet. For example, the game service could utilize a series of servers, or a series of server farms located throughout the world to host video games. Players then connect to the gaming service using a variety of different client devices including game consoles, smart phones, tablets, personal computers, and other computing devices.

Embodiments of the present invention monitor characteristics of a game session to determine whether computing resources should be added or subtracted from the game session. A game session runs a single instance of a game title. A game service may host multiple instances of the same game along with instances of other games. Each instance of the game runs in a game session. The game session runs the video game code responsible for creating the playing experience for the users.

The game session runs a video game title accessed by one or more players. Embodiments of the present invention run game titles that are written for the game session. Titles written for the game session do not use code to manage server resources or other computing resources. Instead, the computing resources allocated to the game session are dynamically updated by the game service in response to changes in game session characteristics.

Various characteristics of the game session may be monitored and used to allocate computing resources. Usage of computing resources, such as central processing unit ("CPU") may be monitored directly. In another embodiment, the number of players connected to the game is monitored and computing resources are reallocated dynamically as the number of players increases or decreases. The number of players that causes a reallocation of computing resources may vary from title to title. In one embodiment, the number of players associated with a certain unit of computing resources is editorially established and in an allocation table. For example, a first title may use one unit of computing resources per eight players. Thus, every time an additional eight players are added to the game session an additional unit of computing resources would be added. Another game title may be allocated a single unit of computing resources for every thirty-two players. When a game session ends, the computing resources may recycled to other game sessions running the same title. Recycling to the same title allows the machine to run the game without the game code needing to be reloaded onto the machine. When only a chunk of a game title, such as a level, is loaded into a machine's active memory then the computing device may recycled to a game session running the same level.

In addition to the number of players, other game session characteristics may be monitored. For example, the game level or progress in a game level may be monitored. More computing resources could be allocated to a game session, in anticipation of reaching a level that a requires more resources. Further, the health of the game session or computing resources associated with the game session may be monitored. In one embodiment, computing resources showing unhealthy characteristics, such as slower than expected processing times, are removed from the game session and healthy resources are added.

A unit of computing resources may be demarked by a physical machine or a virtual machine. In one embodiment, an additional server, which is a physical machine, is allocated to a game session as a computing unit. In this case, the physical server has a one-to-one relationship with the computing unit or resource. In another embodiment, virtual machines are used. A virtual machine artificially segregates a single physical computing device into two or more virtual machines. Each virtual machine is able to carry out the capabilities of a full server but shares the capacity of the CPU and other components of the hardware device with one or more additional virtual machines. A single virtual machine could comprise multiple physical machines in some embodiments. In one embodiment, a single real or virtual machine hosts multiple games sessions.

The capacity of a real or virtual machine may differ. Thus, physical or virtual machines of different sizes maybe assigned to a single game session. The game service may select a computing resource having a first capacity or a second capacity for various games as needed. A game session for a first game title may run on a server having a first capacity and a game session for a second game title may run on a server having a second second capacity. In one embodiment, a game session uses several virtual machines. In another embodiment, a single virtual machine runs multiple game sessions.

In addition to managing the computing resources by adding and subtracting computing resources to a game session as needed, network resources may also be managed by the game service to facilitate communications between the client devices and the game session. Thus, as additional computing devices are allocated to a game session, the network resources may be updated to route communications appropriately to the computing devices on which the game session is running.

When allocating new resources to a game session, the resources may be selected for their proximity to the computing resources already serving the game session. For example, in a game service running over multiple server farms, a computing resource located within the same server farm may be favored over a computing resource in a different server farm. Similarly, a server with close proximity within a rack or virtual relationship with the machines already part of the game session may be preferred over those having a less proximate relationship. In addition, computing devices that already have the game code preloaded are selected first. Computing resources may be recycled from an active game session that ends to an active game session running the same title, perhaps at the same game stage.

The client devices connected to the game session may play different roles for different games. In one embodiment, the client devices only send control signals to the game session. The game code running in the game session processes the control signals to change the game state. For example, a player or object within a game may move in response to the control input. The game instance may generate a rendered video game image that reflects the updated game state and communicate the rendered image to one or more clients connected to the game instance running in the game session. Each client may receive a different rendered video game images from the perspective of the player associated with the client. Though described as a client from the perspective of the game service, the client could be a server to other computing devices. For example, a computing device within a residence could serve game content to other computing devices, including tablets or smart phones over a local-area network.

In another embodiment, game geometry and other game information is sent from the server and combined with image data resident on the client to generate a rendered video game image on the client device. Other divisions of processing between the client and game service are possible.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
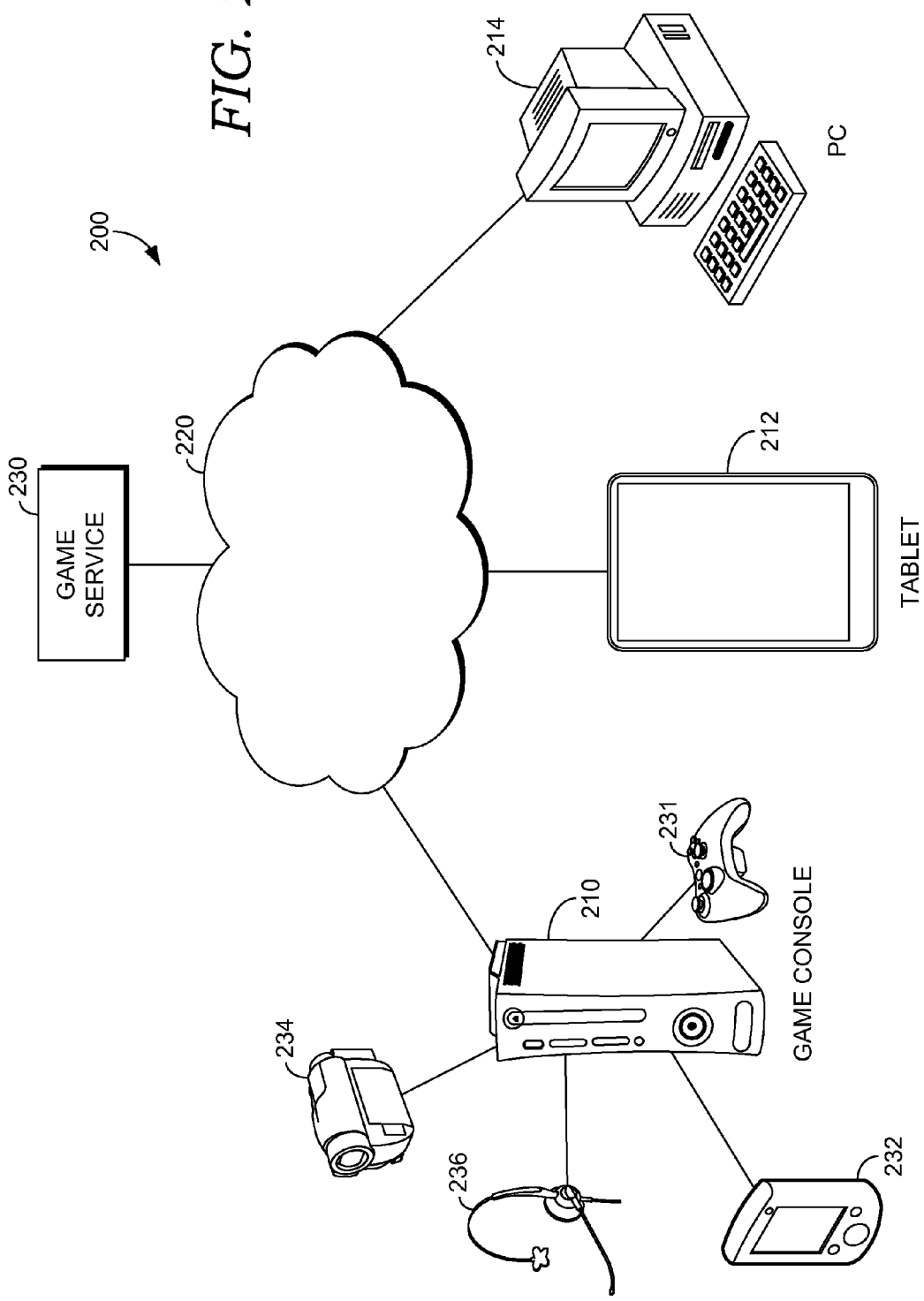
FIG. 2 is a diagram of online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The tablet 232 can be both a game controller and a game client as mentioned previously with tablet 212. Tablet 232 is shown coupled directly to the game console 210, but the connection could be indirect through the Internet or a subnet. In one embodiment, the game service 230 helps make a connection between the tablet 232 and the game console. The tablet 232 is capable of generating numerous input streams and may also serve as a display output mechanism. In addition to being a primary display, the tablet 232 could provide supplemental game information near information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image and/or other game output.

Exemplary Game Client and Game Service for Remote Gaming

Figure 3:
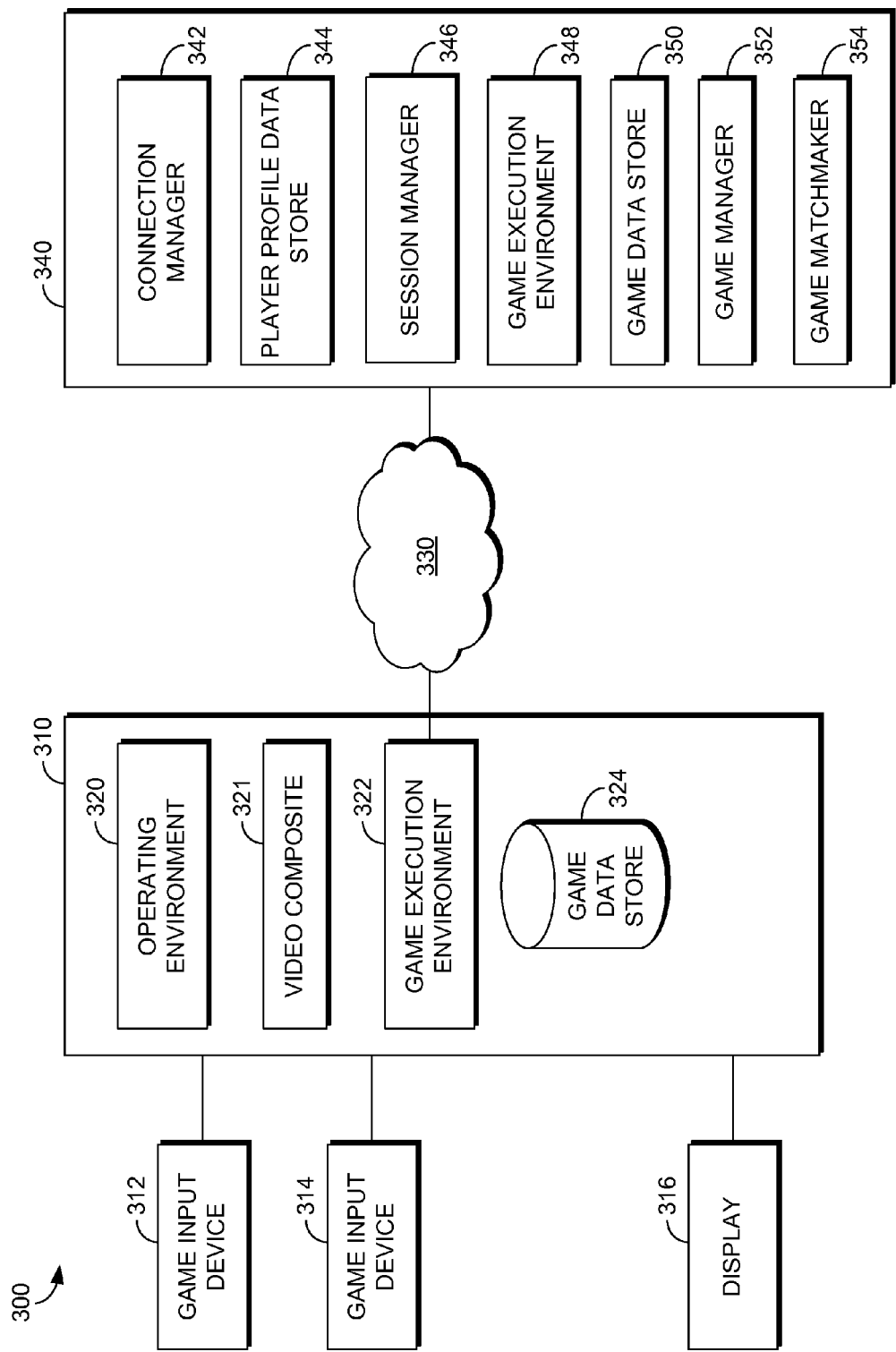
FIG. 3 is a diagram of a remote gaming computing environment, in accordance with an embodiment of the present invention.

Turning now to FIG. 3, an exemplary remote gaming environment 300 is shown, in accordance with an embodiment of the present invention. The remote gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, and a game data store 324. Other components of the game client 310 are not shown for the sake of simplicity.

The operating environment 320 may be provided by an operating system that manages the hardware and provides services to applications running on the game client 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files.

The game execution environment 322 comprises the gaming resources on the client 310 required to execute instances of a game or part of a game. In some embodiments, the client 310 does not include a game execution embodiment or the computing resources to execute the game. The game execution environment 322 comprises active memory along with computing and video processing resources. The game execution environment 322 receives gaming controls and causes the game to be manipulated and progressed according to game programming. In one embodiment, the game execution environment 322 outputs a rendered video stream that is communicated to the display 316. The game execution environment 322 may execute part of a game to generate game images that are combined with rendered images received from the game server 340 by the video composite component 321

The video composite component 321 merges rendered video game images received from the game server 340 with rendered video game images rendered by the client 310 to form a single image that is output to display 316. Rendered video game images could refer to just a single color image or the color image and depth buffer data that is used to successfully composite server and client images. The video composite component may perform scaling and other functions to generate a video output that is appropriate. Some embodiments of the present invention do not use or comprise a video composite component 321.

The game server 340 comprises a connection manager 342, a player profile data store 344, a session manager 346, a game execution environment 348, a game data store 350, a game manager 352, and a game matchmaker 354. Though depicted as a single box, the game server 340 could be a server farm that comprises numerous machines, or even several server farms. Several of the servers could act as clients for a central server that coordinates the game experience.

The connection manager 342 builds a connection between the client 310 and the server 340. The connection manager 342 may also provide various authentication mechanisms to make sure that the user is authorized to access the game service provided by the server 340. The connection manager may provide security, encryption, and authentication information to servers and virtual machines as they are added to a game session. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. A player's score, achievements, and progress through game levels may be stored. Further, the player profile data store 344 may store information about individual player preferences such as language preferences. The player may access the game level information from multiple clients. For example, the player's progress could be accessed from a friend's game console or on the player's mobile device.

Information regarding a player's game client and speed of the network connection may also be stored in the player profile data store 344 and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored.

Session manager 346 monitors characteristics of a game session and allocates computing resources as needed when characteristics of the game session change. In one embodiment, each game session has a dedicated session manager 346 responsible for allocating computing resources to the game session. In another embodiment, a session manager 346 monitors multiple game sessions, including game sessions running different video game titles, and allocates the computing resources as needed. The session manager 346 may allocate computing resources according to needs that vary by video game title. The session manager 346 manages game sessions operating in game execution environment 348.

As explained in more detail, the session manager 346 may monitor a characteristics of a game session. An exemplary characteristic is the number of players within a game session. As the number of players within a game session increases or decreases computing resources maybe automatically added to or subtracted from the game session. In one embodiment, computing resources are added as various thresholds are crossed. For example, computer resources may be added when eight, sixteen, thirty-two, sixty-four, and ninety players are joined to the game session. Each threshold may be associated with a different amount of computing resources. The amount of computing resources added may not be linear. The relationships between player threshold and computing resources may be established and stored in a table that is used by session manager 346 to determine when and how much computing resources should be added to an ongoing session.

When managing computing resources and creating new game sessions, the session manager 346 may recycle a computing resource from another game session running the same title. The computing resource is recycled in the sense that the game code does not need to be reloaded into active memory. Instead, new game state information can be provided and the already loaded code may be used in the new game session with new players.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls, such as reduced controller input, through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and loaded into active memory for use in a game session. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections to active games. In one embodiment, there are individual game managers for each game available through the game service. Taking a single game as an example, the game manager will drop players into requested games. In one embodiment, a player may connect to a game through the game manager 352. In other words, the game manager 352 may act as a gatekeeper for communications and connections between individual game instances. When a player drops out of a game, an instruction may go to the game manager 352 to retrieve and save the player's progress into the player's profile within player profile data store 344.

The game matchmaker 354 tracks ongoing game sessions and helps player find a game session to join. The game matchmaker 354 may generate an interface that allows prospective players to search for game sessions in which a friend is participating. The matchmaking component 354 may allow players to search for active game sessions having players with similar skill levels, for example, as indicated by player rank, game progress, or achievements obtained within a game. In one embodiment, the matchmaker 354 only returns game sessions having space available for more players.

In another embodiment, the matchmaker 354 may return a list of currently closed game sessions with an estimated wait the player can expect before an opening is available. The wait may be calculated by analyzing churn for the session. The churn measures the rate at which players leave the game session. The churn may be calculated using an average for all game sessions of the same game title. The churn may be specific to the particular game session. Wait time may also take into consideration other players waiting to join. Thus, if four players were waiting to join a session that averages an opening every 30 seconds, then the estimated wait time would be two minutes. The matchmaker 354 may manage a queue of players waiting to join a game and add them to the game as openings become available.

The matchmaker 354 may also generate a list of open game sessions for a player to join. The list may be filtered, even without the prospective player's input, to only list sessions with similar level players or that are otherwise appropriate for the prospective player. For example, only game titles the player has a license to play may be listed. In another embodiment, all games are listed, but an indication lets the player know which games will require purchase of an additional license. The players are given the opportunity to buy a license to play a game through the interface.

The matchmaker may make an effort to keep game sessions full, while killing others, by manipulating the game sessions listed for new players to join. Players are directed to game sessions in a way that minimizes the overall use of computing resources. For example, an effort may be made to keep game sessions full of players instead of having twice as many half-full game sessions. Thus, if a game session is near a threshold number of players where computing resources could be removed, then that game session may not be listed, unless responsive to a specific query for another player or other sought out characteristics unique to that session. This allows the game session to fall below the threshold and for resources to be removed. On the other hand, game sessions with only a few openings may be listed first in an effort to keep the game session full.

Thus, the matchmaker 354 provides search tools to help players find an open game session that meets their needs. When multiple games sessions meet the players needs, then the player may be added to game sessions in a way that minimizes the total number of game sessions running at a given time.

The matchmaking component 354 may also select game sessions for player to conserve network resources and provide a better game experience. The matchmaking component may look at characteristics of the players' local capabilities for selecting appropriate game session computing resources. As an example, the type of console or the version of the game the player is using may influence which computing resources are selected to run a game session. Further, the player's geographic location influences which data center the player is connected to, in order to minimize network latency. The matchmaking component 354 will prioritize connection to game sessions running in the preferred data center. In general, geographically closer data centers will have less latency, but network conditions may vary. In one embodiment, the network conditions are monitored and a player is matched with a game session running in a data center that has the least latency for the specific player.

Figure 4:
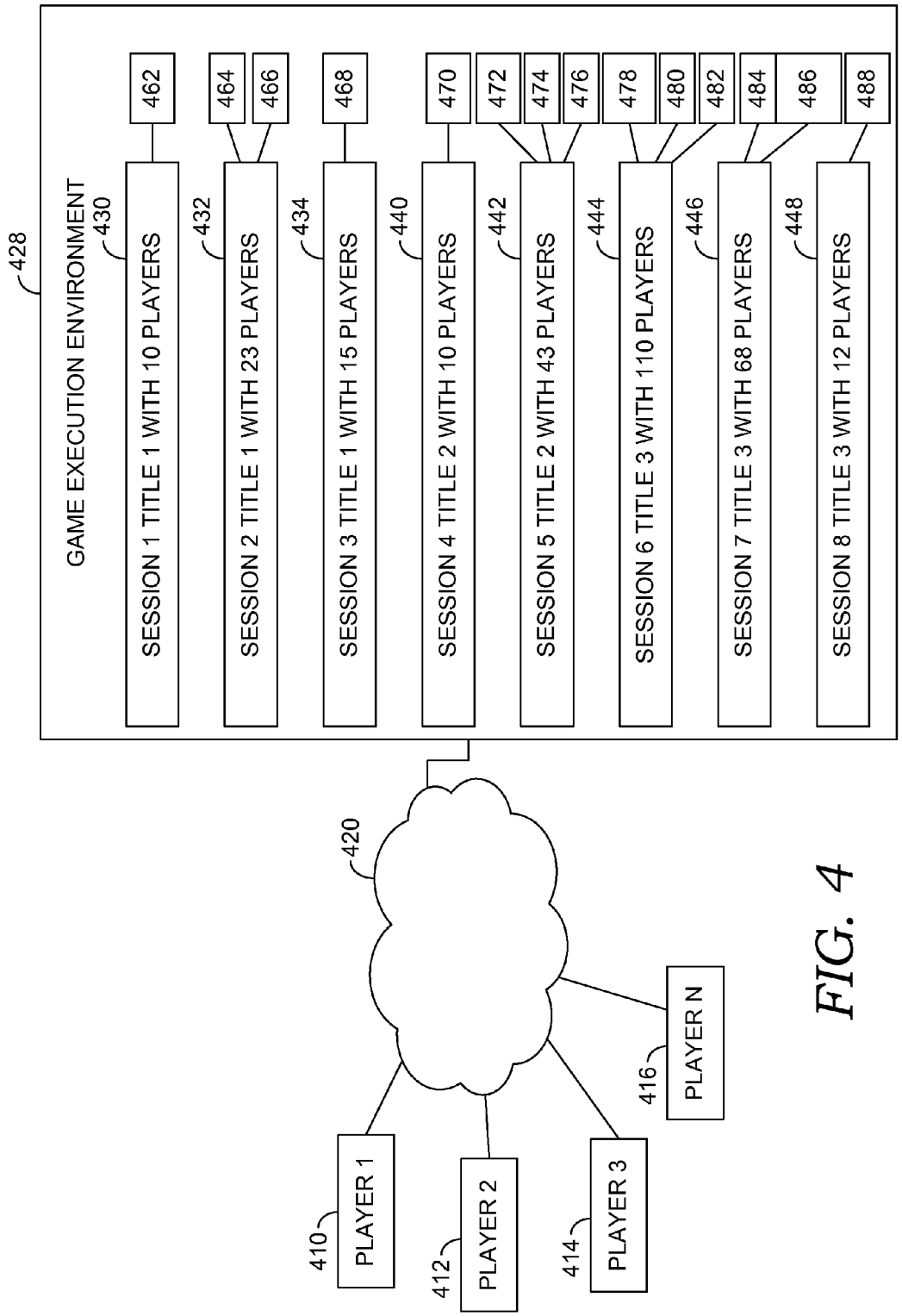
FIG. 4 is a diagram of a game execution environment that is running active game sessions with players connected and computing resources allocated, in accordance with an embodiment of the present invention.

Turning now to FIG. 4, a game execution environment 428 that is running active game sessions with players connected and computing resources allocation, is illustrated in an accordance with an embodiment of the present invention. The game execution environment 428 may be similar to the game execution environment 348 described previously. The game execution environment 428 may be part of a game service such as described previously with reference to FIGS. 2 and 3. For the sake of simplicity, other components within the game service are not shown. The game execution environment 428 is connected to various game clients through network 420. Some of the clients may be other servers, while other clients are game consoles. As mentioned previously, other components such as authorization and connection management components and game managers may route communications between the network 420 and the game execution environment 428.

As can be seen, player 1 on client device 410, player 2 on client device 412, player 3 on client device 414, and player N on client device 416 are connected to the game execution environment 428. Player N is intended to illustrate that any number of players might be remotely connected to the execution environment. Many of the connected players and clients are not shown for the sake of simplicity. As mentioned previously, when players are connected, their player profile information and other I/O channel details may be incorporated into the active game to allow them to play the game.

The game execution environment 428 comprises eight sessions. Each session has computing resources allocated to it. The first session 430 is running title one and has ten players. Computing resource 462 is allocated to session 430. Computing resource 462 may be a single machine, or a virtual machine.

The second session 432 is also running title one but has 23 players. Session 432 is associated with computing resource 464 and computing resource 466. In this example, computing resource 464 and computing resource 466 have the same capacity. That does not need to be the case as will be illustrated subsequently.

The third session 434 is also running title one and has 15 players. Session 434 is associated with computing resource 468. In this illustration, the game session monitor may allocate additional computing resources to a game session running title one when more than eighteen players are within the session. Thus, the third session 434 has a single computing resource 468 with 15 players while the second session 432 has two computing resources allocated to it because it has more than 18 players, with 23.

The fourth session 440 is running a second video game title and has ten players. Title two is different than title one. Computing resource 470 is allocated to game session 440.

The fifth session 442 is also running title two and has 43 players connected. Computing resource 472, computing resource 474, and computing resource 476 are all allocated to session 442. As can be seen, three resources are allocated to session 442 and one resource is allocated to 440 because of the different number of players in the respective sessions. As mentioned, the amount of CPU usage or other game or computing characteristic may be monitored and computing resources allocated according to thresholds.

In one embodiment, characteristics of multiple computing resources are monitored and compared to a threshold. The threshold for each characteristic may be a percentage of the associated resource's total capacity. The same thresholds may be used across multiple game titles to allocate resources or different threshold could be used for different titles.

The sixth session 444 is running title three with 110 players. Title three is different than title one and title two. As mentioned previously, the thresholds of players used to allocate resources may differ from title to title. Further historical usage patterns may be monitored to allocate resources on a per title basis. For example, titles that commonly attract large numbers of players may start out with more resources. This is indicated by the larger size of computing resource 478 which is allocated to the sixth session 444. A smaller computing resource 480 is also allocated to the sixth session 444. Thus, computing resources of different size may be allocated to game sessions when appropriate.

The different size may reflect the size of virtual machines or physical machines that have a different computing capacity. Computing resource 482 is also associated with the sixth session 444 and is the same size as computing resource 480. This illustrates that a game title may initially start with a larger computing capacity but could be incrementally increased using smaller size computing resources.

The seventh session 446 is also running title three and has 68 players. Computing resource 484 and computing resource 486 are allocated to the seventh session 446. As can be seen, computing resource 486 is larger than computing resource 484.

The eighth session 448 is running title three with 12 players. Computing resource 488 is allocated to the eighth session 448.

Figure 5:
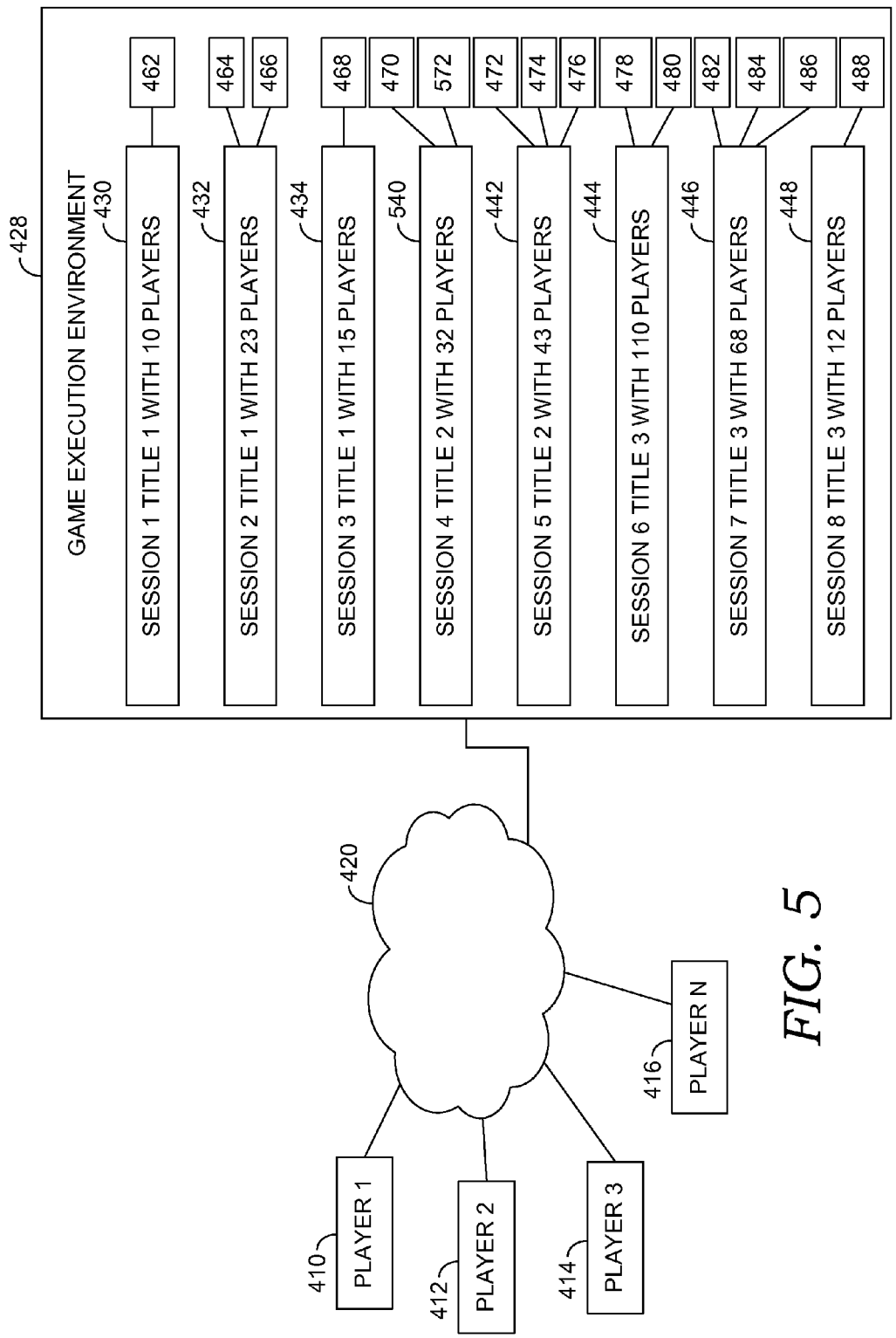
FIG. 5 is a diagram that illustrates reallocation of computing resources in response to players joining an ongoing game session in a game execution environment, in accordance with an embodiment of the present invention.

Turning now to FIG. 5, a gaming execution environment 428 with updated computing resources allocated by a game session manager is shown, in accordance with embodiment of the present invention. Though not shown in FIG. 5, the game execution environment 428, and specifically sessions within the environment 428 are monitored by a session manager, such as session manager 346 described previously with reference to FIG. 3.

Upon changing game session characteristics, computing resources are reallocated. In FIG. 5, all of the sessions described previously with referenced to FIG. 4 are the same except that the fourth session 540 has changed to include 32 players instead of the 10 players described previously in FIG. 4. As a result, computing resource 572 has been allocated to the fourth session 540.

Computing resource 470 is still allocated to the fourth session 540. Thus, as additional players are added to the session 540 additional computing resources are allocated. For example, the threshold being monitored may be the number of players. The player threshold may be 32 in this example. In one embodiment, the characteristic being monitored is associated with a threshold that is less than the full computing capacity. In other words, it may be advantageous to add computing resources before the maximum number of players that the existing computing resources can handle is reached.

Figure 6:
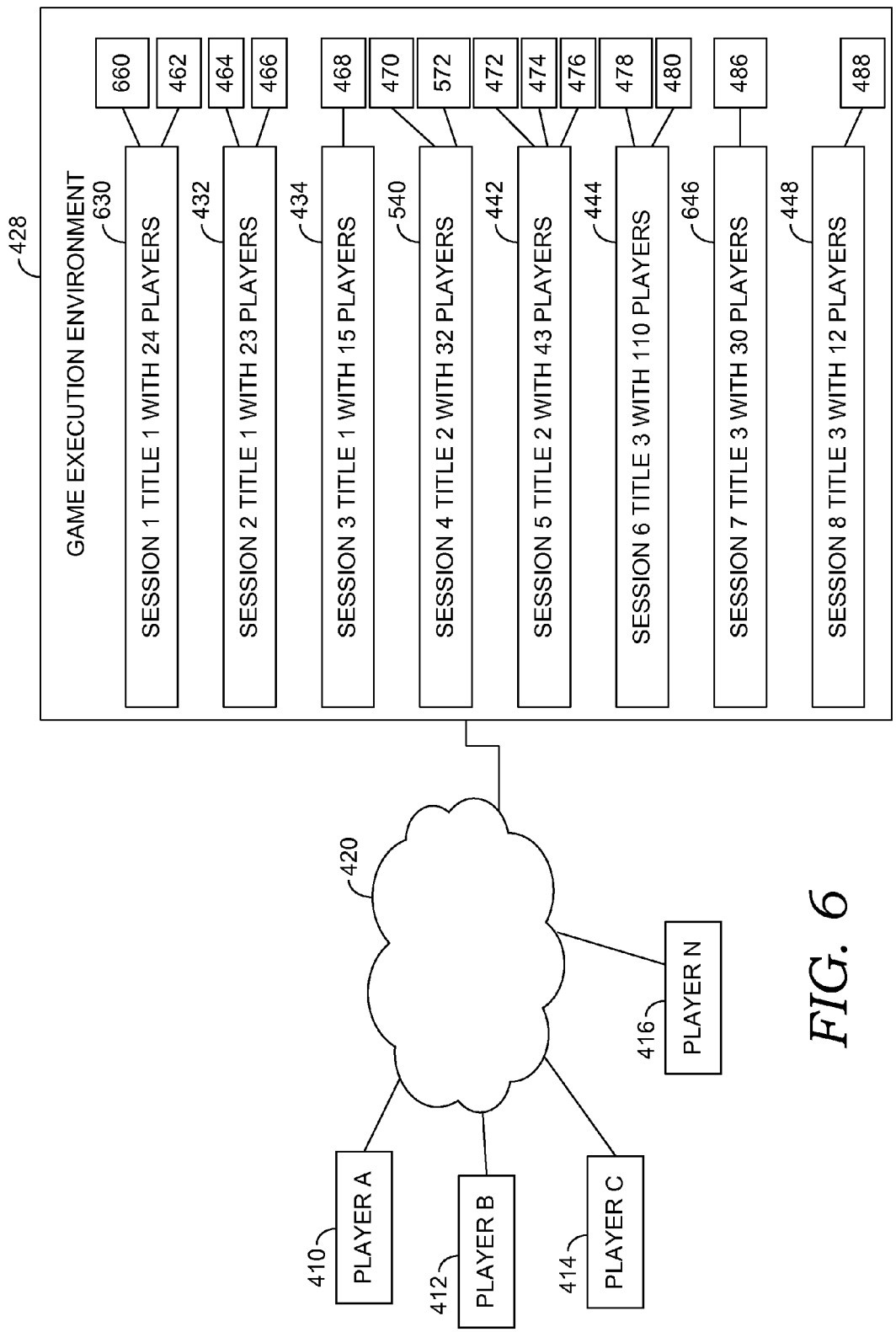
FIG. 6 is a diagram that illustrates reallocation of computing resources in response to players joining an ongoing game session in a game execution environment, in accordance with an embodiment of the present invention.

Turning now to FIG. 6, a game execution environment 428 with updated game session characteristics is shown, in accordance with embodiment of the present invention. The sessions are the same as those shown previously with reference to FIG. 5 or FIG. 4 except that the first session 630 now has 24 players instead of 10 players and the seventh session 646 now has 30 players instead of 68 players. As a result, an additional computing resource 660 is allocated to the first session 630. In contrast, a computing resource 482 and computing resource 484 have been allocated away from the seventh session 646. Thus, computing resources may be allocated to or allocated away from game sessions as the number of players in the session increase or decrease.

Figure 7:
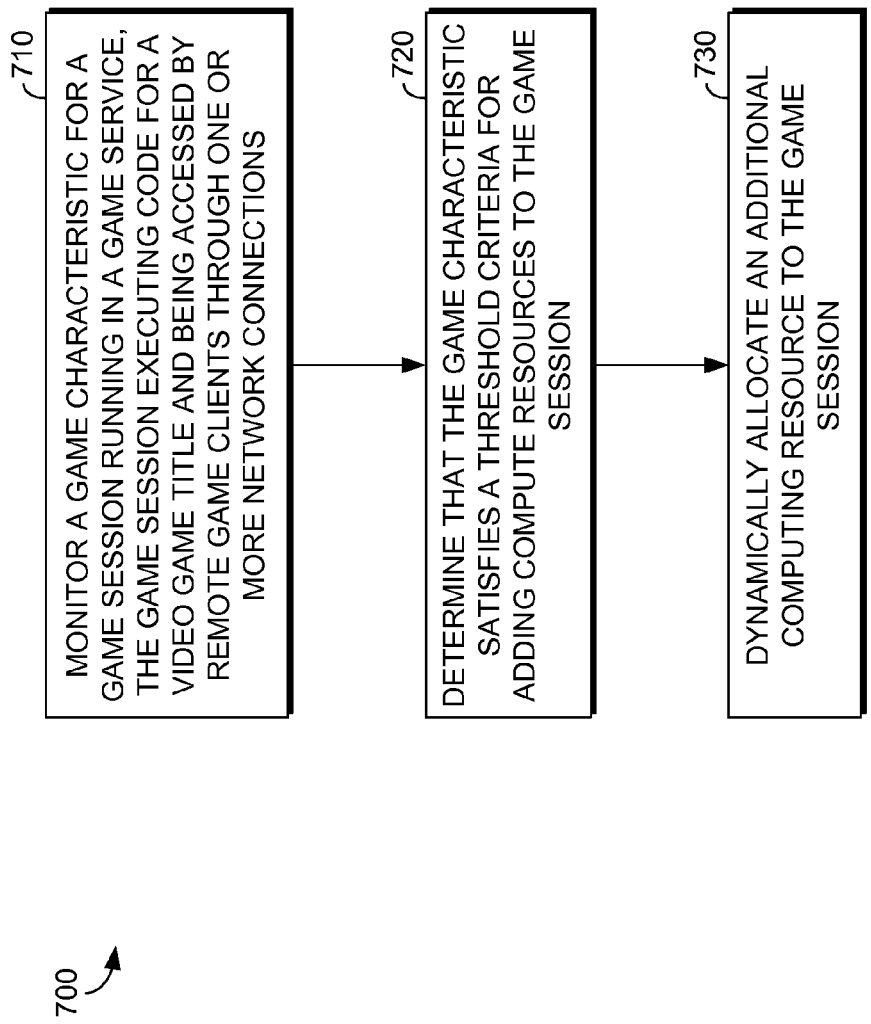
FIG. 7 is a flow chart showing a method of managing compute resources allocated to a remote game session, in accordance with an embodiment of the present invention.

Turning now to FIG. 7, a method 700 of allocating computing resources to a remote gaming session is shown, in accordance with embodiment of present invention. As explained previously, the remote game session is provided by a game service. The game service may use multiple servers, and even multiple server farms to provide the service. The game session runs a single video game title and may include multiple players. The players connect to the game service using clients that connect to the game service hardware over a wide area network, such as the Internet. In one embodiment, the game session and the game code within the game session does not have the capability to monitor or allocate computing resources. The game code is written to be agnostic regarding the computer resources used to run it. Instead, the game code is written against a game session that has computing resources allocated to it by a session manager as described previously with reference to FIG. 3. The session manager may manage multiple game sessions running different titles.

At step 710, a game characteristic for a game session running on a game service is monitored. The game session is executing code for a video game title and being accessed by remote game clients through one or more network connections. As mentioned, a variety of game characteristics may be monitored. In one embodiment, the game characteristic is the number of remote players within the game session. The number of remote players may change as players are invited to a session or log out of the session. In one embodiment, the game session has an unlimited number of players that may be accommodated. Additional resources are allocated as more players are added to the game session.

In another embodiment, the game characteristic monitored is the level of the game or part of the game being accessed by one or more players. For example, as a group of players within a game session transitions between game levels, the game levels may require a different amount of computing resource to run smoothly for the players. As the players approach the next level in the game, additional resources may be brought to bear in the game session. The computing resources are then ready as the players transition to the level that requires the additional power.

At step 720, the game characteristic is determined to satisfy a threshold criterion for adding resources to the game session. As mentioned, the threshold may be a number of players, and the number of players may vary from game to game and even within levels of the same game title. Other characteristics may be tied to hardware usage and the capacity of the hardware within a physical device or virtual device on which the game session is running. For example, the CPU or active memory may be monitored and when at or near capacity the threshold criteria could be satisfied.

The threshold criterion is less than capacity for the hardware component running the game session. Embodiments of the present invention may monitor any hardware component identified as a bottleneck to effective game play. In other words, the hardware component with the capacity that is consumed first during game play may be monitored as a trigger to add computing resources. Different games may stress or utilize the capacity of machines in different ways. Some games may be more graphically intensive and utilize more graphics resources while other games may be more network intensive due to the type of control signal received or the output density. For example, games utilizing a richer control sources, such as audio control or image data may consume network-interface capacity faster than they consume available CPU or graphics processing capacity. The limiting factor may be determined and monitored on a title-by-title basis.

At step 730, additional computing resources are allocated to the game session. As mentioned, the computing resources allocated may be a physical device or a virtual device. Further, the computing resource allocated may be of a different size than the original computing resource and computing resources may be incremented in different amounts for different game titles. For example, relatively small amounts of computing resources may be allocated to game titles that typically do not see the number of players within the game session change rapidly. In contrast, game sessions with higher churn rates (e.g., the number of players entering and leaving the game) may expand more rapidly. Historical usage data may be mined to determine the optimum amount of resources to add to each game as well as to set the different threshold levels and determine what characteristics to monitor for a particular game title. In one embodiment, physical computing resources are added in even CPU numbers. For example, two, four, or eight CPU's and associated resources could be added to a game session at one time.

Figure 8:
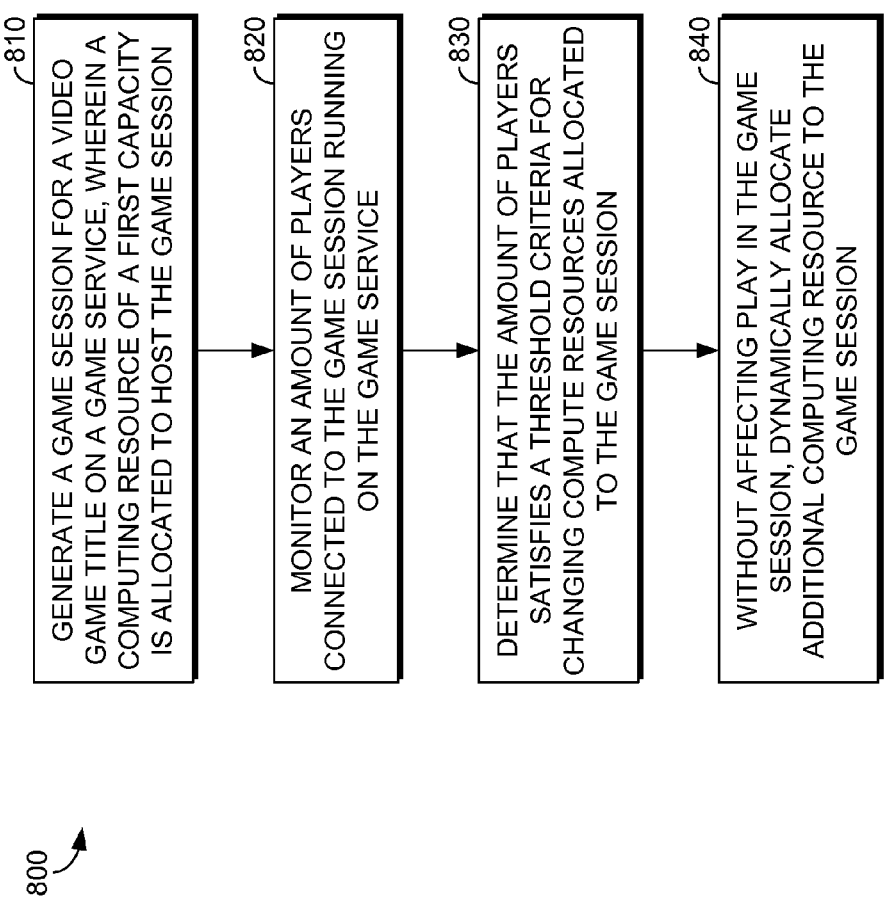
FIG. 8 is a flow chart showing a method of managing compute resources allocated to a remote game session, in accordance with an embodiment of the present invention.

Turning now to FIG. 8, a method 800 of allocating computer resources to a remote gaming session is provided, in accordance with an embodiment of the present invention. At step 810, a game session for a video game title is generated on a game service. As mentioned, the game service provides video game titles that may be accessed remotely by players using their client devices, such as Smart phones, tablets, and game consoles. A computing resource of a first capacity is allocated to host the game session initially.

At step 820, an amount of players connected to the game session running on the game service is monitored. At step 830, the amount of players within the game session is determined to satisfy a threshold criteria for changing compute resources allocated to the game session. The threshold criteria may bound a high and low range of number of players associated with different levels of compute resources. For example, when a low threshold is met, computing resources may be taking away from the game session. When a high threshold criteria is met, additional compute resources may be added to the game session. At step 840, without affecting play in the game session, additional computing resources are dynamically allocated to the game session.

Figure 9:
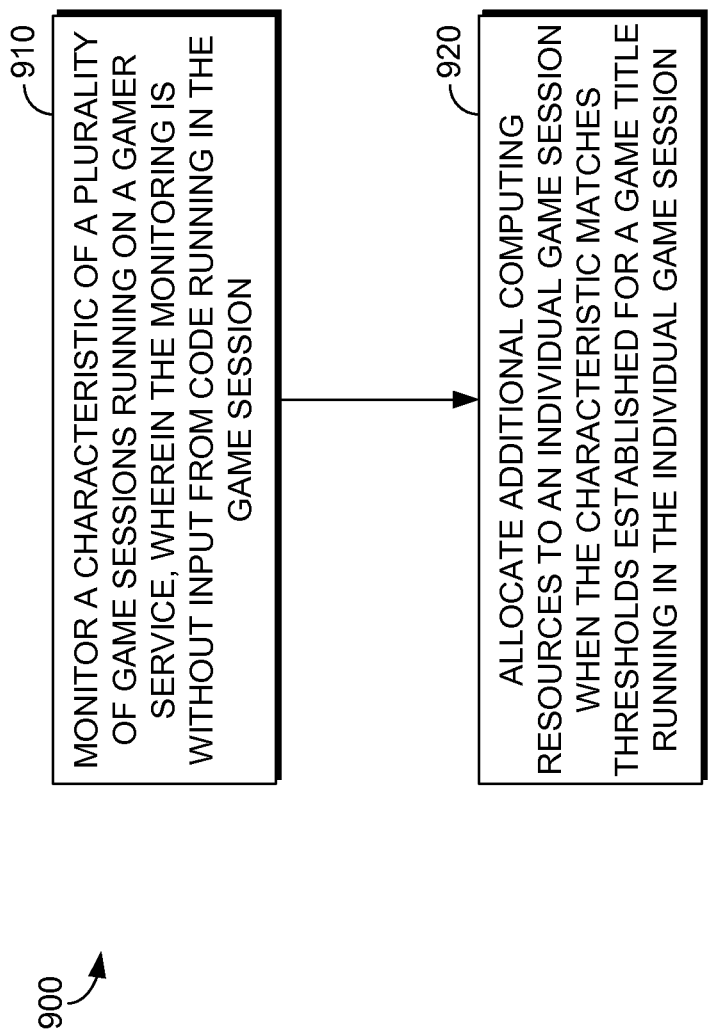
FIG. 9 is a flow chart showing a method of managing compute resources allocated to a remote game session, in accordance with an embodiment of the present invention.

Turning now to FIG. 9, a method 900 of managing compute resources allocated to a remote game session is shown, in accordance with an embodiment of the present invention. At step 910, a characteristic of a plurality of gaming sessions running on a game service is monitored. The monitoring is without input from code running in the game sessions. In other words, the monitoring service or function is separate from the game code used to generate the game experience for the players. Additionally, multiple gaming sessions are monitored, possibly across multiple video game titles.

At step 920, additional computing resources are allocated to an individual game session when the game characteristic matches thresholds established for a game title running in the individual game session. Thus, the threshold is specific to the game title and may vary from game title to game title.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer-executable instructions embodied thereon that when executed by a computing device perform a method of allocating compute resources to a remote game session, the method comprising:
   monitoring, by a game service, progress through a first game level of a single instance of a multi-player video game title that features multiple players interacting with each other within the single instance and being controlled from remote game clients that access the game service through one or more network connections, the single instance having multiple game levels wherein the first game level and a second game level require different amounts of computing resources;
   determining that the progress through the first level satisfies a threshold criteria for adding an additional game server to the single instance of the game session in preparation for the multiple players reaching the second game level; and
   in response to said determining, dynamically allocating an additional computing resource to the single instance of the game session while the game session is ongoing in preparation for the multiple players reaching the second game level, wherein the computing resource is an additional game server.

2. The media of claim 1, wherein the threshold criteria are customized for the multi-player video game title.

3. The media of claim 1, wherein the additional game server is a physical machine.

4. The media of claim 1, wherein the additional game server is a virtual machine.

5. The media of claim 1, wherein the monitoring is without input from code running in the single instance.

6. The media of claim 1, wherein the method further comprises adding additional players to the single instance while the game session is ongoing, wherein the additional players utilize resources on the additional game server.

7. The media of claim 1, wherein the method further comprises receiving requests from clients to join the game session and automatically allocating network resources to route control communications from clients into the game session.

8. A computing system comprising:
   a processor; and
   computer storage memory having computer-executable instructions stored thereon which, when executed by the processor, are configured to:
   monitor a characteristic of a plurality of game sessions running on a game service, wherein the monitoring is without input from code running in an individual game session, the individual game session comprising a single instance of a multiplayer video game title, the game service hosting multiple instance of the multiplayer video game title, the single instance having a first capacity for players, the first capacity being limited by an amount of computing resources allocated to the single instance;
   receive a request from a new player to join an active game session;
   determine that a first game instance is one player away from a player threshold for removing a computing resource from the first game instance;
   prevent the first game instance from being listed as an available game instance in response to determining the first game instance is one player away from a player threshold for removing a computing resource;
   provide a list of game instances for the new player to join that does not include the first game instance; and
   determine that an additional player has dropped from the first game instance, and, in response, dynamically allocating a computing resource away from the game session.

9. The system of claim 8, wherein the list includes only game instances with a number of players more than one player away from a threshold that requires additional computing resources to be added.

10. The system of claim 8, wherein the method further comprises managing network traffic to and from the individual game session without input from code running in the individual game session.

11. The system of claim 8, wherein the additional computing resource comprises full use of an additional central processing unit and associated hardware.

12. The system of claim 8, wherein the additional computing resource comprises a virtual machine that shares a central processing unit and associated hardware with another virtual machine.

13. A method of allocating compute resources to a remote game session, the method comprising:
   monitoring, by a game service, progress through a first game level of a single instance of a multi-player video game title that features multiple players interacting with each other within the single instance and being controlled from remote game clients that access the game service through one or more network connections, the single instance having multiple game levels wherein the first game level and a second game level require different amounts of computing resources;
   determining that the progress through the first level satisfies a threshold criteria for adding an additional game server to the single instance of the game session in preparation for the multiple players reaching the second game level; and
   in response to said determining, dynamically allocating an additional computing resource to the single instance of the game session while the game session is ongoing in preparation for the multiple players reaching the second game level, wherein the computing resource is an additional game server.

14. The method of claim 13, wherein the threshold criteria are customized for the multi-player video game title.

15. The method of claim 13, wherein the additional game server is a physical machine.

16. The method of claim 13, wherein the additional game server is a virtual machine.

17. The method of claim 13, wherein the monitoring is without input from code running in the single instance.

18. The method of claim 13, wherein the method further comprises adding additional players to the single instance while the game session is ongoing, wherein the additional players utilize resources on the additional game server.

19. The method of claim 13, wherein the method further comprises receiving requests from clients to join the game session and automatically allocating network resources to route control communications from clients into the game session.

* * * * *